US012737134B2

(12) United States Patent
Peter et al.

(10) Patent No.: US 12,737,134 B2
(45) Date of Patent: Sep. 15, 2026

(54) POWER CYCLE DURATION BASED MEMORY INITIALIZATION

(71) Applicant: Micron Technology, Inc., Boise, ID (US)

(72) Inventors: Eldhose Peter, Bengaluru (IN); Kenneth Grossman, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 1 day.

(21) Appl. No.: 19/072,804

(22) Filed: Mar. 6, 2025

(65) Prior Publication Data

US 2025/0284419 A1 Sep. 11, 2025

Related U.S. Application Data

(60) Provisional application No. 63/563,044, filed on Mar. 8, 2024.

(51) Int. Cl.
*G06F 12/00* (2006.01)
*G06F 3/06* (2006.01)

(52) U.S. Cl.
CPC .......... *G06F 3/0632* (2013.01); *G06F 3/0619* (2013.01); *G06F 3/0647* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2017/0177374 | A1* | 6/2017 | Morning-Smith | G06F 1/263 |
| 2022/0236916 | A1* | 7/2022 | Esaka | G06F 3/0659 |
| 2023/0065617 | A1* | 3/2023 | Guan | G06F 12/1009 |

* cited by examiner

*Primary Examiner* — Daniel D Tsui
(74) *Attorney, Agent, or Firm* — Schwegman Lundberg & Woessner, P.A.

(57) ABSTRACT

The disclosure configures a memory sub-system controller to optimize initialization of a memory sub-system based on duration of power cycle. The controller initiates memory initialization routine for starting up a memory sub-system after a power loss event. The controller, as part of executing the memory initialization routine, determines that the memory sub-system has previously lost power for a period of time prior to initiating the memory initialization routine. The controller determines whether the period of time transgresses a threshold period of power loss and selectively executes a first set of operations as part of the memory initialization routine in response to determining whether the period of time transgresses the threshold period of power loss.

20 Claims, 5 Drawing Sheets

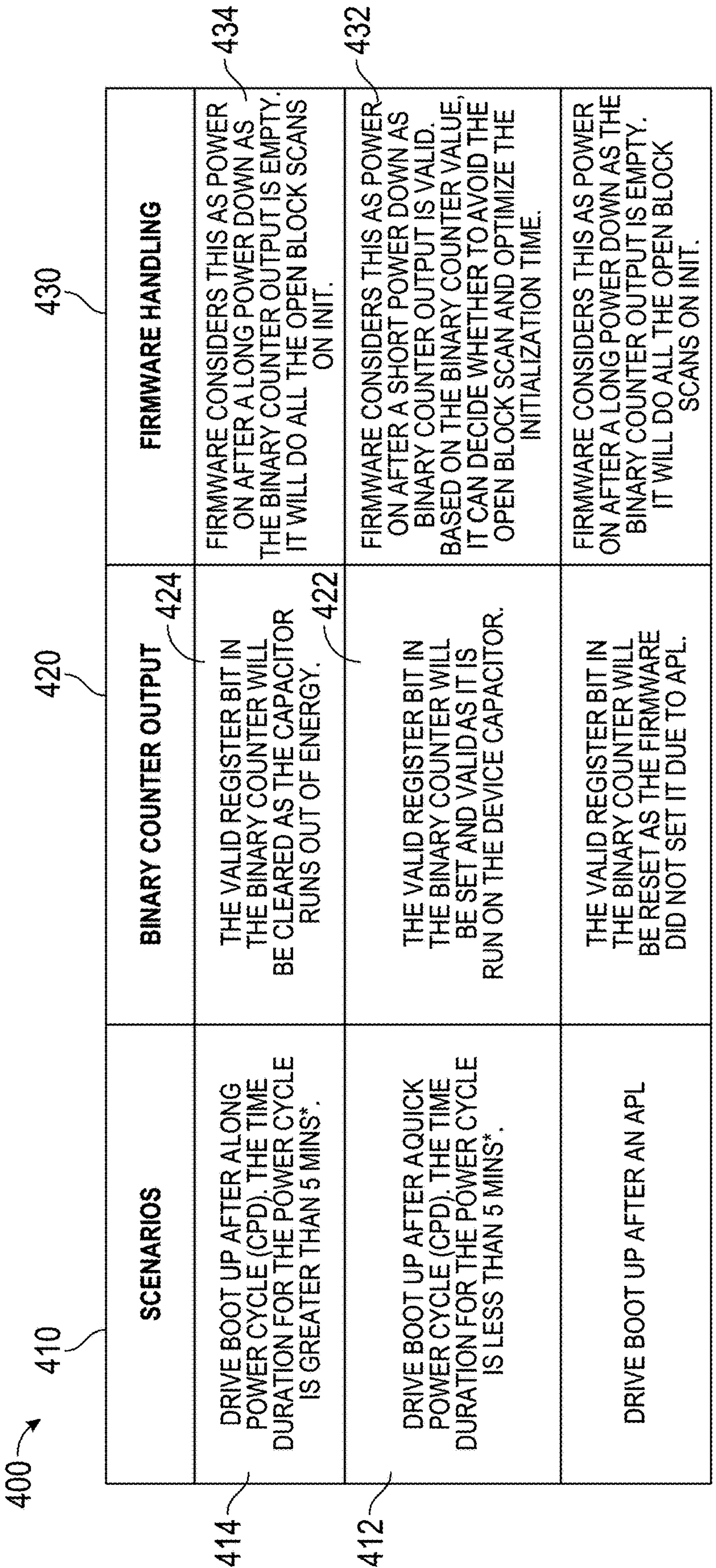

| SCENARIOS | BINARY COUNTER OUTPUT | FIRMWARE HANDLING |
|---|---|---|
| DRIVE BOOT UP AFTER ALONG POWER CYCLE (CPD). THE TIME DURATION FOR THE POWER CYCLE IS GREATER THAN 5 MINS*. | THE VALID REGISTER BIT IN THE BINARY COUNTER WILL BE CLEARED AS THE CAPACITOR RUNS OUT OF ENERGY. | FIRMWARE CONSIDERS THIS AS POWER ON AFTER A LONG POWER DOWN AS THE BINARY COUNTER OUTPUT IS EMPTY. IT WILL DO ALL THE OPEN BLOCK SCANS ON INIT. |
| DRIVE BOOT UP AFTER AQUICK POWER CYCLE (CPD). THE TIME DURATION FOR THE POWER CYCLE IS LESS THAN 5 MINS*. | THE VALID REGISTER BIT IN THE BINARY COUNTER WILL BE SET AND VALID AS IT IS RUN ON THE DEVICE CAPACITOR. | FIRMWARE CONSIDERS THIS AS POWER ON AFTER A SHORT POWER DOWN AS BINARY COUNTER OUTPUT IS VALID. BASED ON THE BINARY COUNTER VALUE, IT CAN DECIDE WHETHER TO AVOID THE OPEN BLOCK SCAN AND OPTIMIZE THE INITIALIZATION TIME. |
| DRIVE BOOT UP AFTER AN APL | THE VALID REGISTER BIT IN THE BINARY COUNTER WILL BE RESET AS THE FIRMWARE DID NOT SET IT DUE TO APL. | FIRMWARE CONSIDERS THIS AS POWER ON AFTER A LONG POWER DOWN AS THE BINARY COUNTER OUTPUT IS EMPTY. IT WILL DO ALL THE OPEN BLOCK SCANS ON INIT. |

*FIG. 4*

POWER CYCLE DURATION BASED MEMORY INITIALIZATION

PRIORITY APPLICATION

This application claims the benefit of priority to U.S. Provisional Application Ser. No. 63/563,044, filed Mar. 8, 2024, which is incorporated herein by reference in its entirety.

TECHNICAL FIELD

Examples of the disclosure relate generally to memory sub-systems and, more specifically, to performing startup or initialization operations of the memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

FIG. 4 is a block diagram of example memory initialization operations performed based on power loss duration, in accordance with some examples.

DETAILED DESCRIPTION

Figure 1:
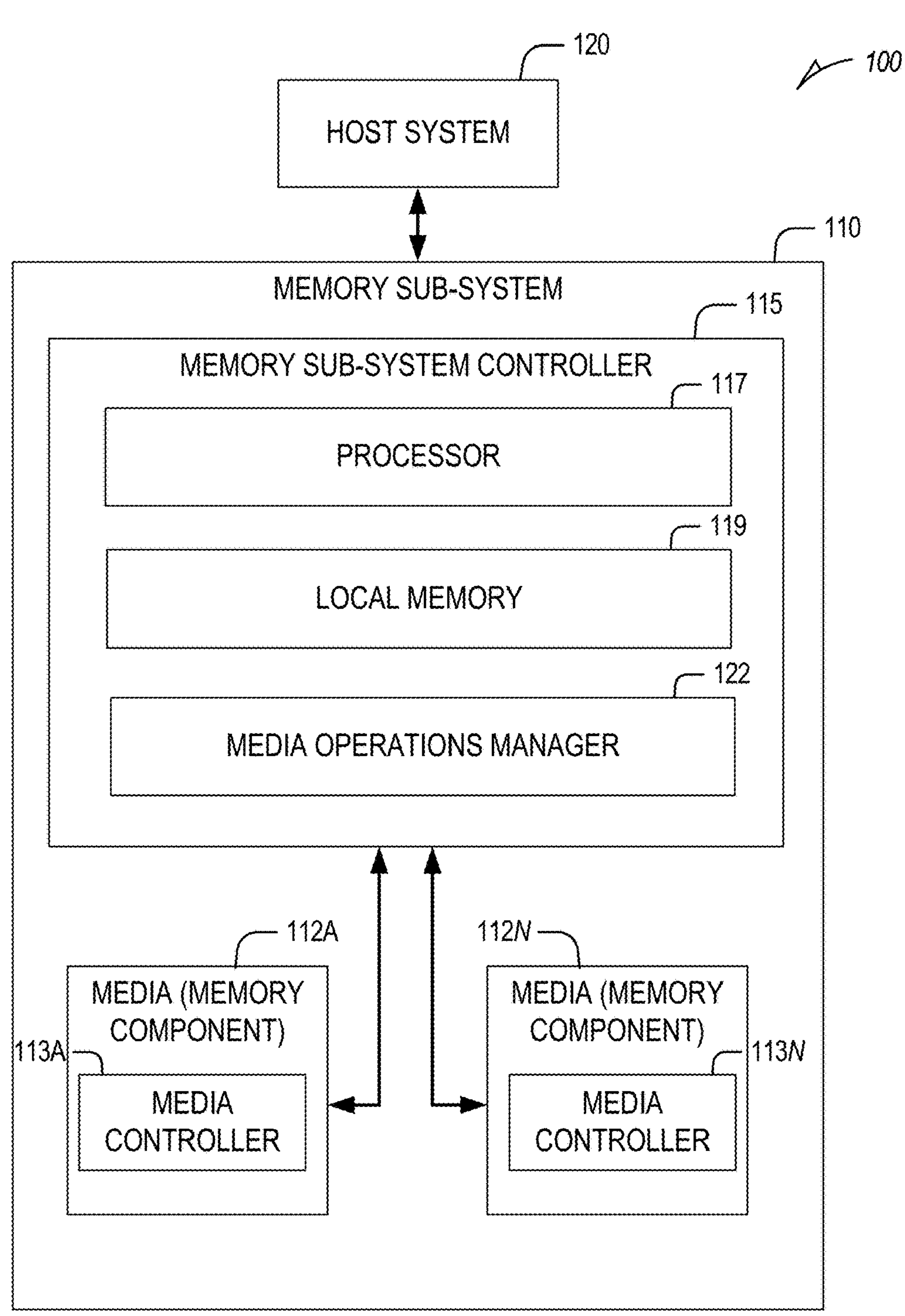
FIG. 1 is a block diagram illustrating an example computing environment including a memory sub-system, in accordance with some examples.

Examples of the present disclosure configure a system component, such as a memory sub-system controller, to initialize a memory sub-system after encountering a power loss event in an efficient manner. Specifically, the disclosed techniques can measure how long a power loss event occurred in the memory sub-system. The power loss event represents a period of time during which the memory sub-system received no power or has lost power. Based on the duration of the power loss event, the controller can selectively perform a subset of memory initialization operations. This way, in cases where the duration of power loss was less than a threshold period of time, the subset of memory initialization operations can be skipped or not executed to optimize the memory sub-system initialization. In cases where the duration of power loss was greater than the threshold period of time, the subset of memory initialization operations is executed to reduce errors in the memory sub-system. Namely, by conditioning the performance of certain memory initialization operations on the duration of power loss, the memory sub-system can be initialized faster and with greater efficiency.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations (also referred to as backend operations), such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., negative-and (NAND) devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Typically, when a NAND flash memory device is powered on after experiencing a power loss, it encounters several inefficiencies that can significantly impact its performance and reliability. One of the primary challenges is the need to scan open or partially written blocks to determine their status and whether they experience any charge loss and need to be refreshed. This process is crucial because power loss can interrupt write operations, leaving the data integrity of these blocks in question. The scanning not only delays the device's readiness for new operations but also poses a risk to data integrity if blocks were being written at the moment of power loss. Another inefficiency arises from the NAND flash requirement that memory cells be erased before new data is written. If a power loss occurs after a block has been erased but before new data is written, the block remains empty, wasting an erase cycle and unnecessarily contributing to the device's wear. Frequent power losses exacerbate this issue, accelerating wear on the NAND cells and diminishing the device's lifespan.

Conventional systems mitigate these issues by performing certain initialization operations when the NAND flash memory devices are powered on. These initialization operations can include performing error correction algorithms to detect and correct data corruption and scanning open or partially written blocks for charge loss. These initialization operations aim to improve NAND flash reliability and performance, particularly in scenarios involving unexpected power interruptions, ensuring that the device can efficiently manage wear, maintain data integrity, and quickly return to a fully operational state after a power loss. However, these initialization operations usually take a great deal of time to perform during which the flash memory device is unavailable to the host to write data. This introduces delays on the host systems and can waste resources.

Examples of the present disclosure address the above and other deficiencies by providing a memory sub-system controller that initializes a memory sub-system after encountering a power loss event in an efficient manner. Specifically, the disclosed techniques provide specialized hardware (e.g., a physical capacitor and physical counter) that can be used by the memory controller to measure how long a power loss event occurred in the memory sub-system. Based on that duration, the controller can selectively perform a subset of memory initialization operations (e.g., certain memory initialization operations can be skipped or prevented from being performed if the power was lost for less than a threshold period of time). This improves the speed and efficiency at which the memory sub-system is initialized following (or in response to) being powered on after losing power (e.g., a power loss event).

In some examples, the memory controller initiates memory initialization routine for starting up the memory sub-system after a power loss event. The memory controller, as part of executing the memory initialization routine, determines that the memory sub-system has previously lost power for a period of time prior to initiating the memory initialization routine and determines whether the period of time transgresses a threshold period of power loss. The memory controller selectively executes a first set of operations as part of the memory initialization routine in response to determining whether the period of time transgresses the threshold period of power loss.

In some cases, a capacitor is coupled to the at least one processing device and a binary counter is coupled to the capacitor. The memory controller configures the binary counter to count for a period of time corresponding to the threshold period of power loss. The binary counter can be configured to count for the period of time by setting a maximum count value for the binary counter to a specified value. The binary counter can be configured to count for the period of time by setting a clock frequency for the binary counter to a specified value.

The capacitor can be coupled to a power source of the at least one processing device and a host system. The binary counter can be coupled to the power source. In some cases, the binary counter is configured to receive power being discharged from the capacitor when power stops being received from the power source, the power loss event occurring when the at least one processing device stops receiving power from the power source. In some cases, the binary counter generates a value by counting up or down using the power being discharged from the capacitor.

The memory controller obtains the value of the binary counter. The memory controller determines that the value of the binary counter is valid. The memory controller, in response to determining that the value of the binary counter is valid, determines that the period of time fails to transgress the threshold period of power loss. The memory controller prevents performing the first set of operations as part of the memory initialization routine in response to determining that the period of time fails to transgress the threshold period of power loss. In some aspects, the memory controller obtains the value of the binary counter and determines that the value of the binary counter is cleared or reset. In such cases, the memory controller determines that the period of time transgresses the threshold period of power loss. The memory controller performs the first set of operations as part of the memory initialization routine in response to determining that the period of time transgresses the threshold period of power loss.

The first set of operations can include scanning one or more word lines of blocks of the set of memory components that were partially written prior to the power loss event to detect charge loss and condition performing refresh operations for the one or more word lines of the blocks that were partially written. The first set of operations can include continuing migration of data from single level cell (SLC) storage to quad level cell (QLC) storage that was started prior to the power loss event. In some cases, the power loss even results from an asynchronous power loss (APL) instruction received from a host system.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N (which are used to implement the storage capabilities of the memory sub-system 110) can include any combination of the different types of non-volatile memory components and/or volatile memory components and/or storage devices. An example of non-volatile memory components includes a NAND-type flash memory. Each of the memory components 112A to 112N can include one or more arrays of memory cells such as single-level cells (SLCs) or multi-level cells (MLCs) (e.g., tri-level cells (TLCs) or quad-level cells (QLCs)). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations (also referred to as back-end operations), such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application-specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) program-erase count (PEC) values and/or reliability grades associated with different groups of the memory components 112N to 112N and/or different blocks within each of the memory components 112N to 112N of each memory component used to implement the memory sub-system.

The memory sub-system controller 115 can be responsible for other memory management operations, such as wear leveling operations, garbage collection operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

In some examples, the media operations manager 122 initiates memory initialization routine for starting up a memory sub-system after a power loss event (e.g., in response to receiving power from a power source after having been powered down or not receiving power). The media operations manager 122, as part of executing the memory initialization routine, determines that the memory sub-system 110 has previously lost power for a period of time prior to initiating the memory initialization routine. The media operations manager 122 determines whether the period of time transgresses a threshold period of power loss (e.g., power was lost for more than five minutes) and selectively executes a first set of operations as part of the memory initialization routine in response to determining whether the period of time transgresses the threshold period of power loss. For example, the media operations manager 122 can selectively scan one or more word lines of blocks of the set of memory components 112A to 112N that were partially written prior to the power loss event to detect charge loss and condition performing refresh operations for the one or more word lines of the blocks that were partially written. In another example, the media operations manager 122 can continuing migration of data from single level cell (SLC) storage to quad level cell (QLC) storage that was started prior to the power loss event.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein.

Figure 2:
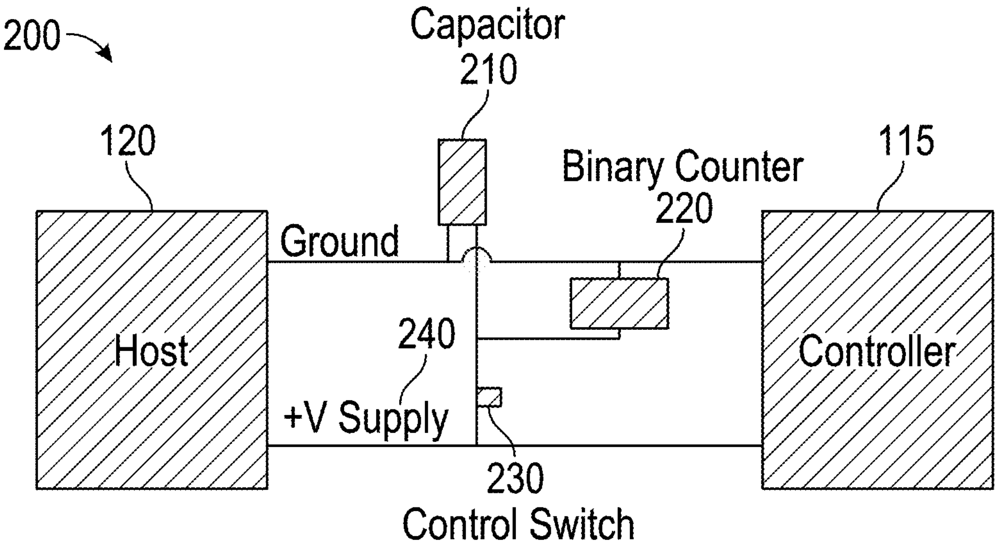
FIG. 2 is a block diagram of power loss duration components coupled to the memory sub-system, in accordance with some examples.

FIG. 2 is a block diagram 200 of power loss duration components coupled to the memory sub-system 110 of FIG. 1, in accordance with some examples. As shown in block diagram 200, the computing environment 100 can include the host system 120 coupled to the memory sub-system 110 (e.g., including the memory sub-system controller 115). The host system 120 can provide a power supply or power source 240 to the memory sub-system 110 and a ground source. Between the host system 120 and the memory sub-system controller 115, the computing environment 100 includes one or more capacitors 210, a binary counter 220 (e.g., a physical logic counter), and/or a control switch 230.

The one or more capacitors 210 can be coupled to the power supply or power source 240, such as via the control switch 230. While the one or more capacitors 210 receive power from the power supply or power source 240 (e.g., prior to a power loss event), a charge is built up and stored in the one or more capacitors 210. In some cases, when power from the power source 240 is cut off or removed (e.g., due to a power outage or asynchronous power loss event), the one or more capacitors 210 stops being charged.

In some examples, power can stop being delivered to the one or more capacitors 210, the memory sub-system controller 115, and the binary counter 220 in response to a controlled power loss event. In some cases, this can be performed in response to the memory sub-system controller 115 receiving an instruction from the host system 120 to perform a power cycle operation. In other cases, this may occur due to an unexpected disruption in power that causes power being delivered to the computing environment 100 to be turned OFF (permanently or temporarily).

In circumstances where the power loss event occurs as a result of a controlled power loss event, the host system 120 can set the Shutdown Notification (CC.SHN) field of the memory sub-system controller 115 to a certain value (e.g., 01b) to indicate a normal controller shutdown operation. In response to determining that the Shutdown Notification has been set to the certain value, the memory sub-system controller 115 begins or initiates performing one or more power down operations. In some cases, the memory sub-system controller 115 (e.g., the firmware of the memory sub-system 110) finishes performing one or more power down operations. In response to completing performance of the one or more power down operations, the memory sub-system controller 115 causes power or charge from the one or more capacitors 210 to begin being delivered to the binary counter 220. The memory sub-system controller 115 can first instruct the binary counter 220 to be reset (e.g., to clear the current count value) and to set a register bit (e.g., a Valid Register Bit) in the binary counter 220. When the register bit is set, this indicates that the binary counter 220 started counting (up/down) due to a controlled power down operation (e.g., the instruction to power cycle the memory sub-system 110 received from the host system 120). This can be referred to as the asynchronous power loss event. In cases where power stopped being delivered to the memory sub-system controller 115 unexpectedly, the binary counter 220 may count up/down (using power received from the one or more capacitors 210) without having the register bit set.

Figure 3:
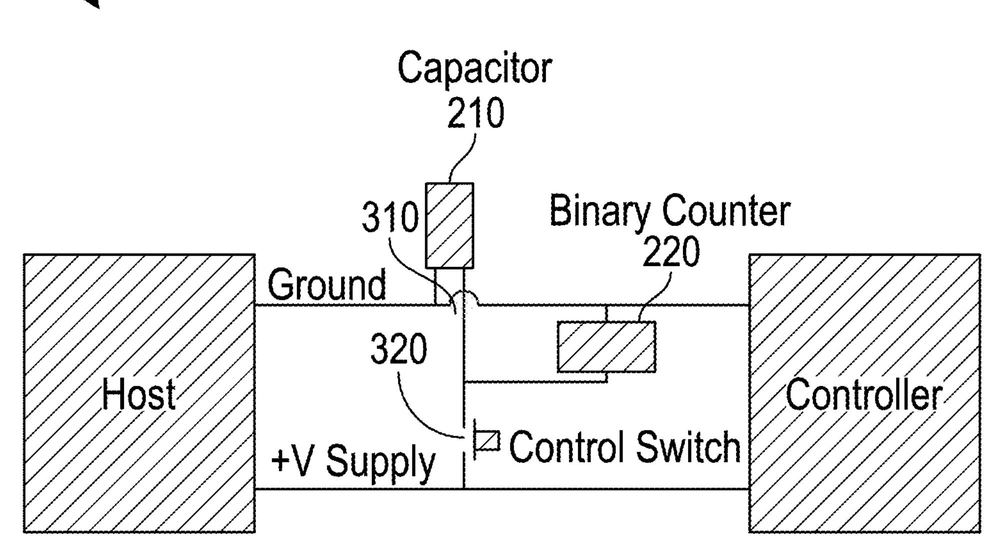
FIG. 3 is a block diagram of power loss duration components coupled to the memory sub-system, in accordance with some examples.

As shown in diagram 300 of FIG. 3, the memory sub-system controller 115 can, after resetting the binary counter 220 and setting the register bit in the binary counter 220, transition the control switch 230 from a closed state (which allows the power supply or power source 240 to be delivered to the binary counter 220 and the one or more capacitors 210) to an open state 320. This results in power being cut off or removed from being delivered to the one or more capacitors 210 and the binary counter 220. Alternatively, if power stopped being delivered unexpectedly (due to an unexpected power loss event), the control switch 230 can continue being in the closed state but may not deliver any power from the power supply or power source 240 to the one or more capacitors 210 and/or the binary counter 220. In both cases, charge stored in the one or more capacitors 210 begins to be discharged from the one or more capacitors 210 via a physical path 310. The charge that is being discharged from the one or more capacitors 210 can flow via the physical path 310 directly to the memory sub-system controller 115 and/or indirectly to the memory sub-system controller 115 via the binary counter 220.

The memory sub-system controller 115 can utilize the charge provided by the one or more capacitors 210 to perform power down operations. Also, the binary counter 220 begins to or continues counting up/down using the charge that is being discharged from the one or more capacitors 210. As the binary counter 220 counts up/down, a value stored by the binary counter 220 is updated at a frequency set by a clock signal internal to the binary counter 220 or externally received from the memory sub-system controller 115. In some cases, the clock frequency is set to a certain value to control the rate at which the binary counter 220 reaches the maximum count value. In some cases, the maximum count value of the binary counter 220 is set based on a threshold duration for power loss used to selectively control whether certain initialization operations are performed when power resumes being delivered to the memory sub-system controller 115.

In some examples, once the charge that was stored by the one or more capacitors 210 is completely depleted (e.g., when the one or more capacitors 210 run out of power or charge), the memory sub-system controller 115 and the binary counter 220 stop receiving power. At this point, the binary counter 220 stops updating (e.g., incrementing/decrementing) the counter value and loses the currently stored counter value. Also, the memory sub-system controller 115 can stop performing power down operations.

In some examples, power from the power supply or power source 240 resumes being delivered to the one or more capacitors 210, binary counter 220, and/or the memory sub-system controller 115. In response to receiving power after encountering the power loss event, the memory sub-system controller 115 begins executing one or more initialization operations as part of a memory initialization routine for starting up the memory sub-system 110. One of the initialization operations executed by the memory sub-system controller 115 include a determination of how long the power loss event lasted. Namely, the memory sub-system controller 115 can determine whether the amount of time that the memory sub-system controller 115 did not receive power transgresses a threshold period of time. The memory sub-system controller 115 can selectively perform certain sets of memory operations based on whether the amount of time that the memory sub-system controller 115 did not receive power transgressed the threshold period of time or not.

For example, in cases where the power loss lasted longer than the threshold period of time (e.g., the amount of time that the memory sub-system controller 115 did not receive power transgressed the threshold period of time), the memory sub-system controller 115 can identify one or more word lines of blocks of the set of memory components 112A to 112N that were partially written prior to the power loss event (e.g., the memory sub-system controller 115 can search for open blocks). The memory sub-system controller 115 can scan such open blocks to detect charge loss and condition performing refresh operations for the one or more word lines of the open blocks that were partially written on whether the charge loss exceeded a threshold or not. As another example, in cases where the power loss did not last longer than the threshold period of time (e.g., the amount of time that the memory sub-system controller 115 did not receive power fails to transgress the threshold period of time), the memory sub-system controller 115 can skip the operations for scanning previously open blocks.

As another example, in cases where the power loss lasted longer than the threshold period of time (e.g., the amount of time that the memory sub-system controller 115 did not receive power transgressed the threshold period of time), the memory sub-system controller 115 can selectively continue migration of data from single level cell (SLC) storage to quad level cell (QLC) storage that was started prior to the power loss event. Namely, the memory sub-system controller 115 can identify one or more blocks that were being migrated from SLC to QLC before the power loss event occurred and in which migration was not completed. The memory sub-system controller 115 can repeat or restart the migration operation in response to determining that the power loss lasted longer than the threshold period of time. Alternatively, the memory sub-system controller 115 can resume the migration operation from where the migration operation was interrupted in response to determining that the power loss did not last longer than the threshold period of time.

FIG. 4 is a block diagram of example memory initialization operations performed based on power loss duration, in accordance with some examples. For example, in order to determine whether the power loss event lasted longer than the threshold period of time, the memory sub-system controller 115 can access information (e.g., a count value stored in the binary counter 220 and the valid register bit status stored in the binary counter 220). The memory sub-system controller 115 can retrieve a table 400. The table 400 can list various scenarios 410 of power loss events, their corresponding binary counter 220 outputs 420, and what operations 430 are performed by the memory sub-system controller 115 for each scenario.

In some cases, a first scenario 414 can represent resumption of power being delivered to the memory sub-system controller 115 after more than a threshold period of time (e.g., 5 minutes). In such cases, output 424 of the binary counter 220 can include a valid register bit being cleared and/or a count value that is below a threshold (e.g., a zero count value) stored in the binary counter 220. This is because the binary counter 220 may have stopped counting and lost the count value when the charge from the one or more capacitors 210 was depleted. In response, the memory sub-system controller 115 performs a set of operations 434 including scanning open blocks and restarting SLC to QLC block migration.

In some cases, a second scenario 412 can represent resumption of power being delivered to the memory sub-system controller 115 after less than the threshold period of time (e.g., 5 minutes). In such cases, output 422 of the binary counter 220 can include a valid register bit being set and valid and/or a count value that is greater than the threshold stored in the binary counter 220. This is because the binary counter 220 may have continued counting during the entire period of time from power being lost (e.g., power not being delivered from the power supply or power source 240) and resumption of delivery of power from the power supply or power source 240 including the period of time when the charge from the one or more capacitors 210 was being received by the binary counter 220. In response, the memory sub-system controller 115 performs a set of operations 432 including skipping scanning open blocks and resuming SLC to QLC block migration.

In some cases, a scenario can exist resulting from an APL. In this case, the valid register bit in the binary counter 220 can be reset and the memory sub-system controller 115 can perform the same operations as set of operations 434.

Figure 5:
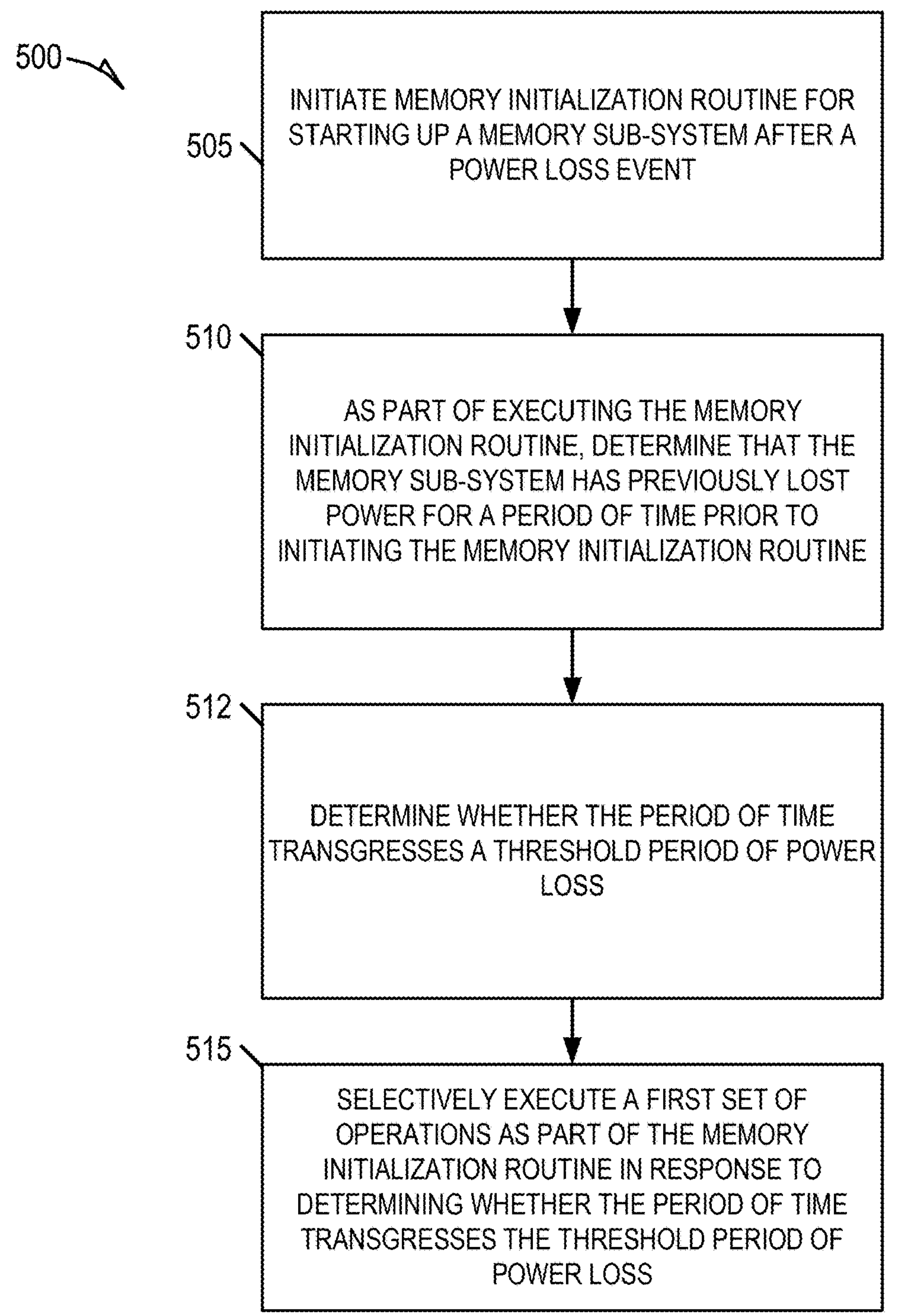
FIG. 5 is a flow diagram of an example method to initialize a memory sub-system, in accordance with some examples.

FIG. 5 is a flow diagram of an example method 500, in accordance with some examples. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 505, with a media operations manager 122 of a memory sub-system (e.g., memory sub-system 110) initiating memory initialization routine for starting up a memory sub-system after a power loss event. Then, at operation 510, the media operations manager 122, as part of executing the memory initialization routine, determining that the memory sub-system has previously lost power for a period of time prior to initiating the memory initialization routine. The media operations manager 122 determines whether the period of time transgresses a threshold period of power loss at operation 512. Then, at operation 515, the media operations manager 122 selectively executes a first set of operations as part of the memory initialization routine in response to determining whether the period of time transgresses the threshold period of power loss.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device configured to perform operations comprising: initiating memory initialization routine for starting up the memory sub-system after a power loss event; as part of executing the memory initialization routine, determining that the memory sub-system has previously lost power for a period of time prior to initiating the memory initialization routine; determining whether the period of time transgresses a threshold period of power loss; and selectively executing a first set of operations as part of the memory initialization routine in response to determining whether the period of time transgresses the threshold period of power loss.

Example 2. The system of Example 1, comprising: a capacitor coupled to the at least one processing device; and a binary counter coupled to the capacitor.

Example 3. The system of Example 2, the operations comprising: configuring the binary counter to count for a period of time corresponding to the threshold period of power loss.

Example 4. The system of Example 3, wherein the binary counter is configured to count for the period of time by setting a maximum count value for the binary counter to a specified value.

Example 5. The system of any one of Examples 3-4, wherein the binary counter is configured to count for the period of time by setting a clock frequency for the binary counter to a specified value.

Example 6. The system of any one of Examples 2-5, wherein the capacitor is coupled to a power source of the at least one processing device and a host system.

Example 7. The system of Example 6, wherein the binary counter is coupled to the power source.

Example 8. The system of any one of Examples 6-7, wherein the binary counter is configured to receive power being discharged from the capacitor when power stops being received from the power source, the power loss event occurring when the at least one processing device stops receiving power from the power source.

Example 9. The system of Example 8, wherein the binary counter generates a value by counting up or down using the power being discharged from the capacitor.

Example 10. The system of Example 9, the operations comprising: obtaining the value of the binary counter; determining that the value of the binary counter is valid; and in response to determining that the value of the binary counter is valid, determining that the period of time fails to transgress the threshold period of power loss.

Example 11. The system of Example 10, the operations comprising: preventing performing the first set of operations as part of the memory initialization routine in response to determining that the period of time fails to transgress the threshold period of power loss.

Example 12. The system of any one of Examples 9-11, the operations comprising: obtaining the value of the binary counter; determining that the value of the binary counter is cleared or reset; and in response to determining that the value of the binary counter is cleared or reset, determining that the period of time transgresses the threshold period of power loss.

Example 13. The system of Example 12, the operations comprising: performing the first set of operations as part of the memory initialization routine in response to determining that the period of time transgresses the threshold period of power loss.

Example 14. The system of any one of Examples 1-13, wherein the first set of operations comprise: scanning one or more word lines of blocks of the set of memory components that were partially written prior to the power loss event to detect charge loss and condition performing refresh operations for the one or more word lines of the blocks that were partially written.

Example 15. The system of any one of Examples 1-14, wherein the first set of operations comprise: continuing migration of data from single level cell (SLC) storage to quad level cell (QLC) storage that was started prior to the power loss event.

Example 16. The system of any one of Examples 1-15, wherein the power loss even results from an asynchronous power loss instruction received from a host system.

Example 17. A method comprising: initiating memory initialization routine for starting up a memory sub-system after a power loss event; as part of executing the memory initialization routine, determining that the memory sub-system has previously lost power for a period of time prior to initiating the memory initialization routine; determining whether the period of time transgresses a threshold period of power loss; and selectively executing a first set of operations as part of the memory initialization routine in response to determining whether the period of time transgresses the threshold period of power loss.

Example 18. The method of Example 17, comprising: configuring a binary counter to count for a period of time corresponding to the threshold period of power loss.

Example 19. The method of Example 18, wherein the binary counter is configured to count for the period of time by setting at least one of a maximum count value or clock frequency for the binary counter to a specified value.

Example 20. A non-transitory computer-readable storage medium comprising instructions that, when executed by at least one processing device, cause the at least one processing device to perform operations comprising: initiating memory initialization routine for starting up a memory sub-system after a power loss event; as part of executing the memory initialization routine, determining that the memory sub-system has previously lost power for a period of time prior to initiating the memory initialization routine; determining whether the period of time transgresses a threshold period of power loss; and selectively executing a first set of operations as part of the memory initialization routine in response to determining whether the period of time transgresses the threshold period of power loss.

Figure 6:
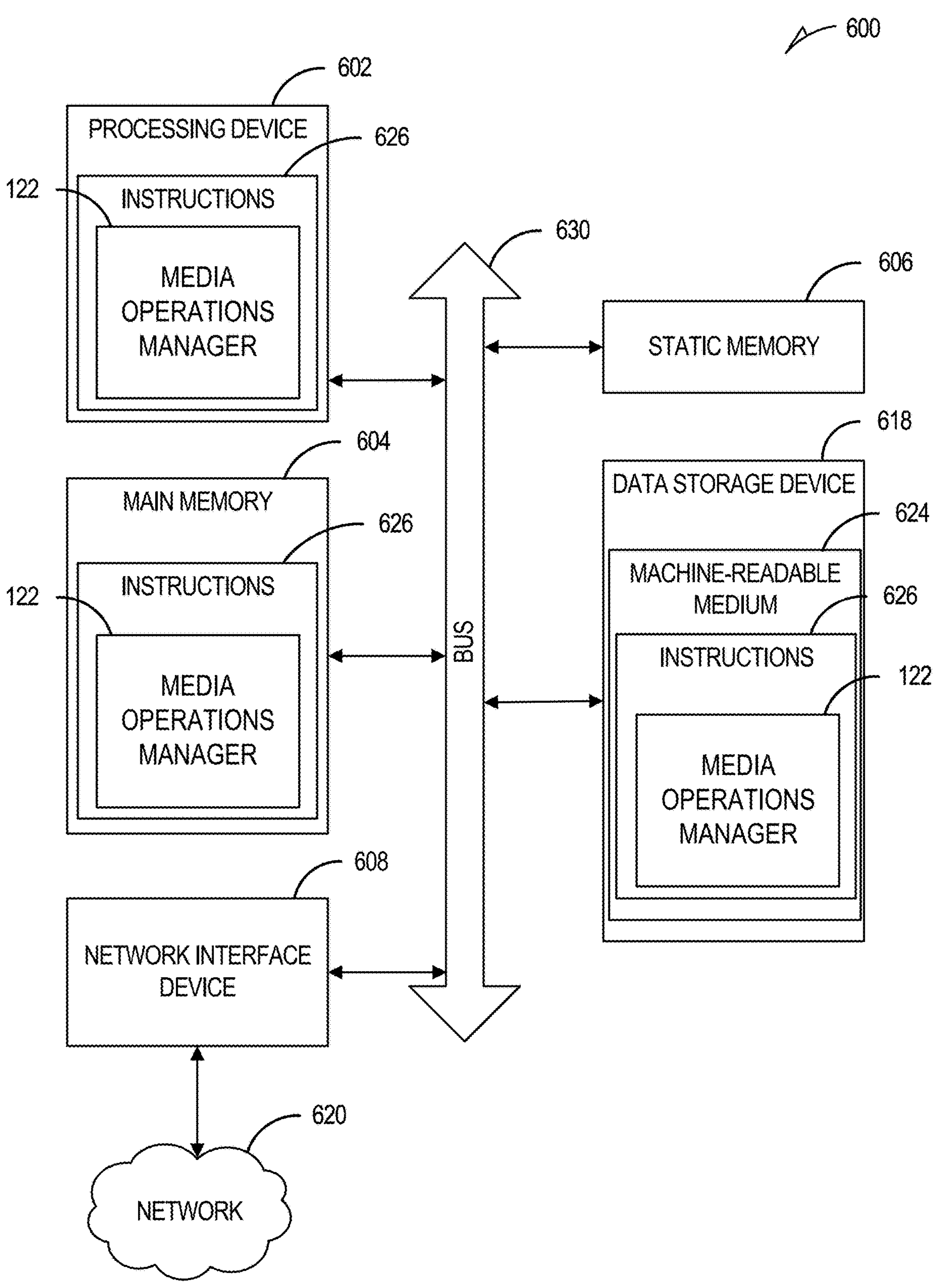
FIG. 6 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 6 illustrates an example machine in the form of a computer system 600 within which a set of instructions can be executed for causing the machine to perform any one or more of the methodologies discussed herein. In some examples, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an ASIC, a FPGA, a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one example, the instructions 626 implement functionality corresponding to the media operations manager 122 of FIG. 1. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; random access memories (RAMs; EPROMS; EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device configured to perform operations comprising:

initiating memory initialization routine for starting up the memory sub-system after a power loss event;

as part of executing the memory initialization routine, determining that the memory sub-system has previously lost power for a period of time prior to initiating the memory initialization routine;

determining whether the period of time transgresses a threshold period of power loss; and selectively executing a first set of operations as part of the memory initialization routine in response to determining whether the period of time transgresses the threshold period of power loss.

2. The system of claim 1, comprising:

a capacitor coupled to the at least one processing device; and a binary counter coupled to the capacitor.

3. The system of claim 2, the operations comprising:

configuring the binary counter to count for a period of time corresponding to the threshold period of power loss.

4. The system of claim 3, wherein the binary counter is configured to count for the period of time by setting a maximum count value for the binary counter to a specified value.

5. The system of claim 3, wherein the binary counter is configured to count for the period of time by setting a clock frequency for the binary counter to a specified value.

6. The system of claim 2, wherein the capacitor is coupled to a power source of the at least one processing device and a host system.

7. The system of claim 6, wherein the binary counter is coupled to the power source.

8. The system of claim 6, wherein the binary counter is configured to receive power being discharged from the capacitor when power stops being received from the power source, the power loss event occurring when the at least one processing device stops receiving power from the power source.

9. The system of claim 8, wherein the binary counter generates a value by counting up or down using the power being discharged from the capacitor.

10. The system of claim 9, the operations comprising:

obtaining the value of the binary counter;

determining that the value of the binary counter is valid; and in response to determining that the value of the binary counter is valid, determining that the period of time fails to transgress the threshold period of power loss.

11. The system of claim 10, the operations comprising:

preventing performing the first set of operations as part of the memory initialization routine in response to determining that the period of time fails to transgress the threshold period of power loss.

12. The system of claim 9, the operations comprising:

obtaining the value of the binary counter;

determining that the value of the binary counter is cleared or reset; and in response to determining that the value of the binary counter is cleared or reset, determining that the period of time transgresses the threshold period of power loss.

13. The system of claim 12, the operations comprising:

performing the first set of operations as part of the memory initialization routine in response to determining that the period of time transgresses the threshold period of power loss.

14. The system of claim 1, wherein the first set of operations comprise:

scanning one or more word lines of blocks of the set of memory components that were partially written prior to the power loss event to detect charge loss and condition performing refresh operations for the one or more word lines of the blocks that were partially written.

15. The system of claim 1, wherein the first set of operations comprise:

continuing migration of data from single level cell (SLC) storage to quad level cell (QLC) storage that was started prior to the power loss event.

16. The system of claim 1, wherein the power loss even results from an asynchronous power loss instruction received from a host system.

17. A method comprising:

initiating memory initialization routine for starting up a memory sub-system after a power loss event;

as part of executing the memory initialization routine, determining that the memory sub-system has previously lost power for a period of time prior to initiating the memory initialization routine;

determining whether the period of time transgresses a threshold period of power loss; and selectively executing a first set of operations as part of the memory initialization routine in response to determining whether the period of time transgresses the threshold period of power loss.

18. The method of claim 17, comprising:

configuring a binary counter to count for a period of time corresponding to the threshold period of power loss.

19. The method of claim 18, wherein the binary counter is configured to count for the period of time by setting at least one of a maximum count value or clock frequency for the binary counter to a specified value.

20. A non-transitory computer-readable storage medium comprising instructions that, when executed by at least one processing device, cause the at least one processing device to perform operations comprising:

initiating memory initialization routine for starting up a memory sub-system after a power loss event;

as part of executing the memory initialization routine, determining that the memory sub-system has previously lost power for a period of time prior to initiating the memory initialization routine;

determining whether the period of time transgresses a threshold period of power loss; and selectively executing a first set of operations as part of the memory initialization routine in response to determining whether the period of time transgresses the threshold period of power loss.

* * * * *